United States Patent

Wang

[11] Patent Number: 5,814,915
[45] Date of Patent: Sep. 29, 1998

[54] BRUSH GEAR FOR AN ELECTRIC MOTOR

[75] Inventor: Patrick Shui-Chung Wang, Repulse Bay, Hong Kong

[73] Assignee: Johnson Electric S.A., Switzerland

[21] Appl. No.: 720,945

[22] Filed: Oct. 4, 1996

[30] Foreign Application Priority Data

Oct. 6, 1995 [GB] United Kingdom .................... 9520389

[51] Int. Cl.$^6$ .................................................. H02K 13/10
[52] U.S. Cl. .......................... 310/242; 310/239; 310/251
[58] Field of Search ................................... 310/68 R, 233, 310/237, 239, 240, 241, 242, 244, 245, 246, 248

[56] References Cited

U.S. PATENT DOCUMENTS

| 3,171,997 | 3/1965 | Hammer ................................. 310/233 |
| 3,433,989 | 3/1969 | Leavitt ................................ 335/205 X |
| 3,736,396 | 5/1973 | Siegel ..................................... 310/239 |
| 4,396,850 | 8/1983 | Herr ......................................... 310/239 |

FOREIGN PATENT DOCUMENTS

| 483376 | 5/1991 | European Pat. Off. . |
| 380771 | 9/1932 | United Kingdom . |
| 2180999 | 4/1997 | United Kingdom . |

OTHER PUBLICATIONS

*Patent Abstracts of Japan*, vol. 95, No. 010 & JP 07 264813 A, Oct. 13, 1995.
Patent Abstract of Japan, vol. 4, No. 112, (E–021) Aug. 12, 1980, JP–A–55 068847, May 23, 1980.
IBM Technical Disclosure Bulletin, "Cam Position Deterector Disk", vol. 25, No. 4, Sep. 1982, New York.

*Primary Examiner*—Thomas M. Dougherty
*Assistant Examiner*—Judson H. Jones
*Attorney, Agent, or Firm*—Ostrolenk, Faber, Gerb & Soffen, LLP

[57] ABSTRACT

A miniature electric motor having a wound rotor uses brush gear 20 comprising strips 23 formed from flexible printed circuit board material 22 having a conductive layer 24 and a supporting layer 25. The conductive layer 24 is electrically connected to motor terminals 19 and to a contact portion 26 arranged for making sliding contact with a commutator of the motor. The contact portion 26 of the brush 21 may be coated with a precious metal for contact or corrosion resistance requirements. The backing material 25, preferably polyimide, is chosen of a desired thickness to provide strength, resilience and vibration damping characteristics while remaining flexible.

17 Claims, 4 Drawing Sheets

BRUSH GEAR FOR AN ELECTRIC MOTOR

FIELD OF THE INVENTION

This invention relates to miniature electric motors and in particular, to the brush gear of such motors.

BACKGROUND ART

Many miniature motors have wound rotors comprising an armature core mounted on a shaft, a commutator mounted on the shaft and located adjacent one end of the armature core and a plurality of armature windings wound on the core and terminated on the commutator. The windings are connected to a source of electrical power by brushes making sliding contact with the commutator. The remaining discussion and the description of preferred embodiments will be based on miniature permanent magnet direct current (pmdc) motors having a wound rotor and a permanent magnet stator as are well known. The brush gear for these motors are of two basic types, cage brushes and leaf brushes. Leaf brushes are also available in two basic types, those that support a brush, usually a block of conductive material, typically principally carbon and those that do not, commonly referred to as finger leaves as the end of the brush arm is often divided into a number, typically three, of separate fingers which contact the commutator.

The brush arm of a leaf brush is typically formed from beryllium copper or preferably, low beryllium copper due to its excellent spring properties and good electrical conductivity. For finger leaf brushes in special applications, the leaf at the point where it makes contact with the commutator may be provided with a covering or inlay of another material to enhance a particular property, e.g., palladium silver for corrosion resistance and conductivity, gold for conductivity, rhodium for wear resistance, etc.

Recently, due to concern over vibration of the brush arm causing deterioration of the brush commutator contact, damping elements of various materials but principally of an elastomeric material have been applied, coated, moulded or glued to the brush arms to absorb at least some of the vibration to improve the performance of the brush gear. However, the main component of the brush arm has remained the elongate strip of beryllium copper. U.S. Pat. No. 4,396,850 assigned to The Singer Company, shows brush gear for a planar commutator comprising carbon brushes affixed to the ends of resilient arcuate arms cut from a brush board which carries printed circuitry electrically connected to the brushes. The board is of a resilient non-conductive material, preferably a plastics material but is not flexible.

SUMMARY OF THE INVENTION

As an alternative to the beryllium copper strip as the main component in a brush leaf application, particularly of the finger leaf type, the present invention utilises a strip of flexible printed circuit board in which strips of conductive material are laid on a flexible backing material where the strip gets its strength and flexibility from the backing material and not from the conductive material. An example of such flexible printed circuit boards may be found in EP 0483376.

Accordingly, in a first aspect thereof, the present invention provides A brush for a miniature electric motor, comprising: an elongate flexible substrate, a flexible conductive layer formed on the substrate and having a contact portion for making sliding contact with a commutator and holder means for supporting the substrate in position to allow the contact portion to make contact with the commutator.

Preferably, holder means comprises two mounting plates fixed to longitudinal ends of the substrate and arranged to be rigidly mounted to a brush gear support plate.

Preferably, the mounting plates have at least one tongue adapted to locate in mounting holes in the support plate and the tongues have barbs for biting into sides of the mounting holes to secure the tongues.

Preferably, the tongue of one of the mounting plates extends through the support plate and forms a motor terminal, the mounting plate being electrically conductive and connected to the contact portion.

Preferably, the tongues of both plates extend through the support plate and form motor terminals and the conductive layer forms two separate electrical circuits connected to respective motor terminals.

Preferably, the contact portion includes a layer of material selected from the group consisting of silver, palladium silver, gold, platinum, rhodium, graphite, hard copper and alloys thereof.

Preferably, the substrate is cut to form fingers supporting respective contact portions and shaped by the orientation of the holder means when mounted to the support plate to cause the contact portions to contact the commutator at diametrically opposite positions.

The substrate may be a polyimide material and the conductive layer may be a predominantly copper material film. With both of these options, the material of the brush resembles a flexible circuit board construction.

The invention also includes an electric motor incorporating at least one such brush.

According to a second aspect, the present invention provides a miniature electric motor comprising: a stator; a wound rotor including a commutator; motor terminals for connecting the motor to a source of electrical power; brush gear for electrically connecting the motor terminals to the commutator; and a brush support plate for supporting the brush gear, characterised in that the brush gear comprises at least one elongate flexible substrate with a flexible conductive layer mounted to the brush support plate by holder means, the conductive layer having a contact portion making sliding contact with the commutator.

In one form, the brush gear comprises two elongate flexible substrates arranged to resiliently urge respective contact portions into sliding contact with the commutator at diametrically opposite locations.

Preferably, each substrate is secured to the brush support plate at its end by two holders and held in a curve to urge the contact portion into sliding contact with the commutator, the contact portion being a section of each strip intermediate its ends.

Preferably, the holder means comprises mounting plates having tongues which locate in holes formed in the support plate, with barbs formed on an edge of the tongues which interfere with the sides of the holes to secure the mounting plates to the support plates.

Alternatively, the holder means comprises at least one holder which is conductive, connected to the conductive layer, integral with one of the motor terminals and extends through the end cap, thereby connecting the motor terminal to the commutator.

Preferably, the substrate is formed with two sets of elongate fingers, each set comprising the same number of fingers being at least one, each finger having a contact portion adjacent its free end and each set of fingers being associated with a respective electrical circuit formed by the conductive layer.

Preferably, the substrate supports electrical components for noise suppression connected to the electrical circuits.

Preferably, the sets of fingers extend from opposite ends of the substrate and are fixed to the brush support plate by two conductive holders with integral motor terminals and arranged to resiliently urge the contact portions of respective sets of fingers to bear on diametrically opposite sides of the commutator.

Preferred embodiments of the invention will now be described by way of example only with reference to the accompanying drawings.

DESCRIPTION OF THE PREFERRED EMBODIMENTS

Figure 1:
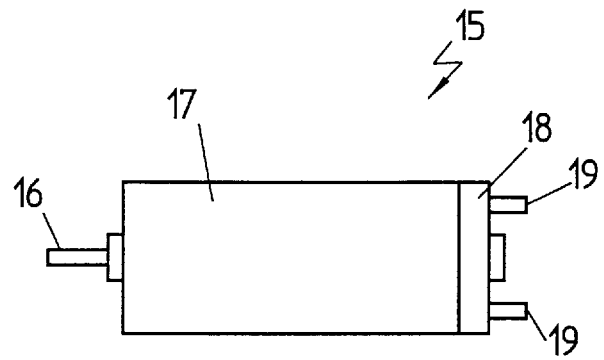
FIG. 1 is a miniature pmdc motor.

The motor of FIG. 1 is a miniature pmdc motor 15 as is well known in the art and is used to illustrate the invention. The motor has a wound rotor including a commutator, an armature core, armature windings wound on the core and terminated on the commutator, all supported by a shaft 16. The shaft 16 is journalled in bearings supported by a housing 17 and an end cap 18. The housing 17 is a bottomed cylinder with an open end. The housing has a permanent magnet stator fitted to its cylindrical wall and the open end is closed by the end cap. The end cap 18 is formed from an insulating plastics material such as nylon resin and supports motor terminals 19 and brush gear which electrically connect the terminals to the commutator to supply electrical power to the armature windings. The brush gear of the motor comprises two brushes connected to respective motor terminals and arranged to make sliding contact with the commutator. However, the brush gear is unique.

Figure 2:
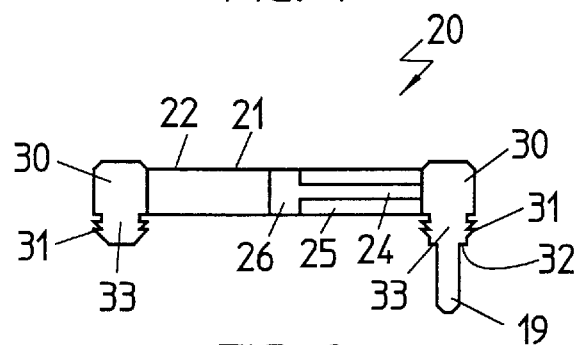
FIG. 2 is a view of a brush according to the preferred embodiment.

FIG. 2 illustrates the preferred brush 21 forming a part of the brush gear of the motor. Each brush 21 is of the brush leaf type and is formed from an elongate strip of flexible printed circuit board material 22 comprising a conductive path 24, preferably a copper film layer, supported by a backing layer 25, preferably of polyimide material. The conductive layer 24 may cover entirely one or both sides of the backing layer but is shown extending from one end only to a portion 26 of the brush near the centre of the strip where it makes contact with the commutator. This contact portion 26 may be left as bare copper or it may be coated with material such as silver, palladium silver, platinum, gold, rhodium, graphite, hard copper or alloys of any of these materials depending on the contact resistance, corrosion resistance and wear characteristics required for the application.

The brush 21 is supported at both ends by brush holders 30 with one brush holder also configured as a motor terminal 19. The terminal/holder 19 is connected to the end of the strip with the conductive layer to directly connect the brush 21 to the terminal 19 electrically. Both brush holders 30 are rigidly and permanently connected to the brush 21 by any suitable means such as soldering, welding, clamping, crimping, riveting and gluing with soldering and upset riveting being preferred for good conductivity and reliable connections. The brush holders 30 may be stamped from sheet material such as brass and thus are conductive plates. Alternatively, they may be formed from other material which is not conductive such as plastics material to insulate the brush from a conductive brush support plate, etc. The brush holders are shown having a tongue 33 for mounting to the brush support plate or end cap. The tongues 33 have barbs 31 formed on the lower end to aid retention in force fit recesses formed in the end cap. The terminal/holder has a terminal portion 19 which extends from the barbed end of the holder 30 and is of narrower width forming a pair of shoulders 32 which abut the bottom of the recess in the end cap to firmly seat the holder at the correct height while preventing the terminal 19 from being pulled through the end cap, for example when the motor is being disconnected from a supply. The barbs 31 prevent the terminal 19 from being pushed into motor when the terminal is being connected to a supply.

Figure 3:
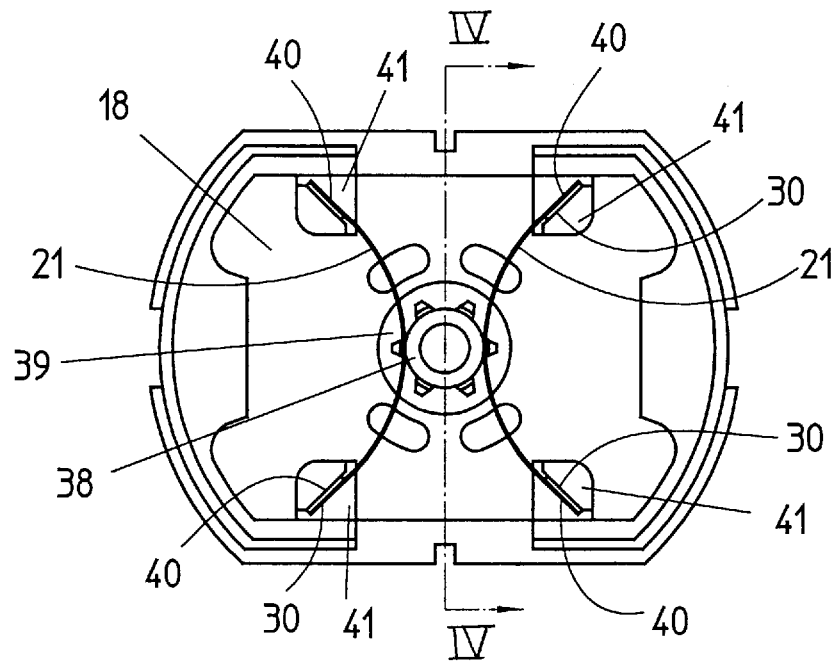
FIG. 3 is an internal view of an end cap of the motor of FIG. 1 incorporating the brush of FIG. 2.
Figure 4:
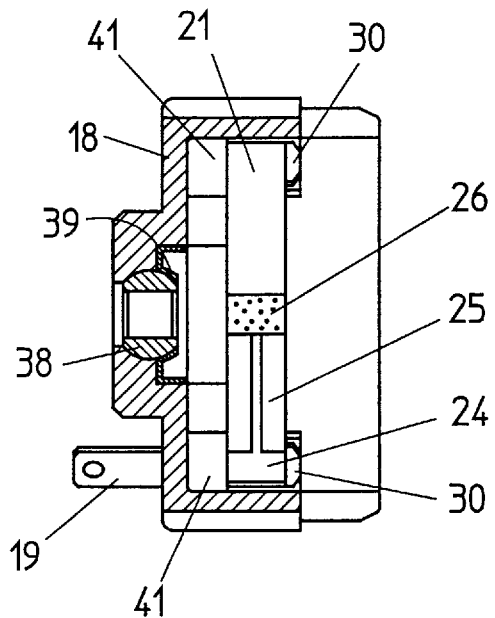
FIG. 4 is a sectional view of the end cap of FIG. 3.

Mounting of the brush gear 20 is shown in FIGS. 3 and 4. FIG. 3 shows the inside of the end cap 18 while FIG. 4 is a cross sectional view taken along IV—IV of FIG. 3. At the centre of the end cap 18 is a self aligning sleeve bushing 38 and its associated retaining spring 39. The brush gear 20 comprises two identical brushes 21 as shown in FIG. 2. The holders 30 of each brush are pressed into recesses 40 formed in bosses 41 on the inner surface of the end cap 18 which are located to cause the brush 21 to extend in an arc bending towards the centre line of the motor such that, in use, a central portion 26 of the brush makes contact with the rubbing surface of the commutator and is urged into contact with the commutator by resilient deformation of the brush 21. In FIG. 4, one motor terminal 19 can be seen extending from the end cap 18 while the brush 21 extends across the end cap from one holder to the other, the contact portion 26 poised for contact with the commutator.

Figure 5:
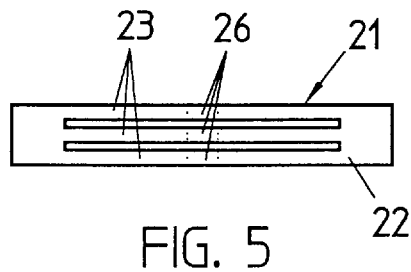
FIGS. 5 to 11 illustrate alternative embodiments of brushes according to the invention.

FIG. 5 is a view of a brush without the holders attached illustrating an alternative construction. The brush 21 is very similar to the brush of FIG. 2 except the conductive layer 24 covers one side of the backing layer 25 and the brush is slotted producing three runners or narrower strips 23 extending between the ends. The brush 21 thus has three separate contact portions 26, each substantially independent of the others as far as vibration is concerned. This brush is mounted in a similar manner to the brush of FIG. 2.

Figure 6:
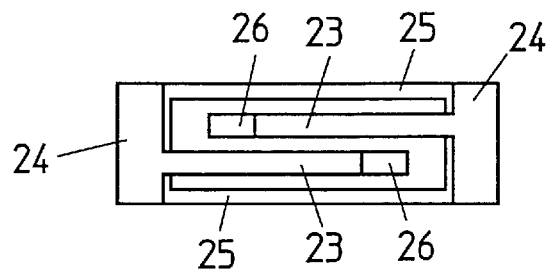
Figure 7:
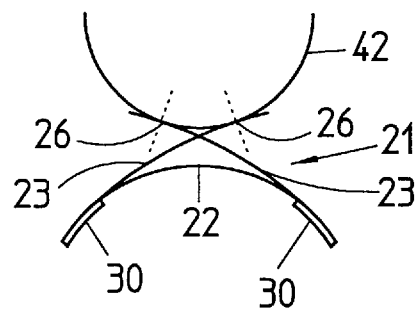

FIG. 6 shows a further alternative brush 21 in which the flexible printed circuit board 22 is cut or slotted to produce two strips or fingers 23 arranged to contact the commutator. The fingers 23 may form part of a single brush or be arranged as separate brushes. FIG. 7 shows schematically the brush 21 of FIG. 6 curved as it would be when mounted in an end cap, in a similar manner to the brush 21 of FIG. 2, the two fingers 23 forming a single brush 21 and contacting the commutator 42 at slightly circumferentially spaced locations which is thought to lead to less electrical noise being generated.

Figure 8:
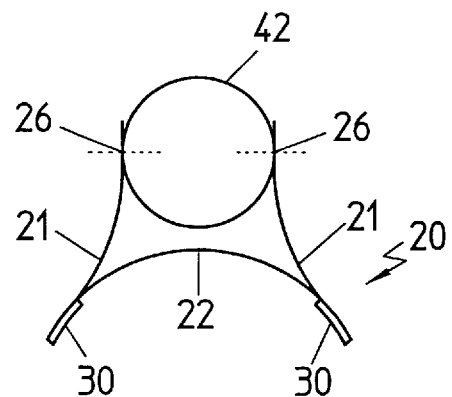

FIG. 8 schematically shows how the flexiboard 22 would be mounted if the fingers formed separate brushes 21. The flexible printed circuit board 22 would be supported by two holders/terminals 30/19 with each finger 23 being electrically connected to a respective holder/terminal and the conductive layer 24 being divided into two separate circuits. The flexible printed circuit board 22 is curved as before but the fingers 23 extend in a cantilevered fashion from the holders to contact the commutator 42 at diametrically opposite locations.

Figure 9:
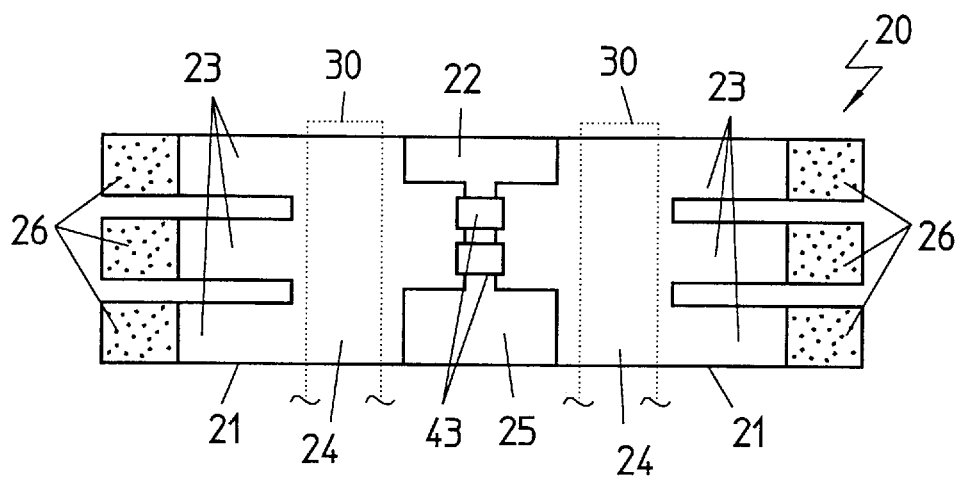

FIG. 9 shows a variation of the brushes of FIG. 6. Here a single flexiboard provides both brushes 21 with each brush being divided into a plurality of fingers 23, in this case three, cantilevered from their respective holders 30. The holders 30 are attached to the brush gear 20 at locations adjacent the roots of the fingers 23 and electrically connected to respective conductive layers. As previously, the holders/terminals 30/19 are received in recesses formed in the end cap with the terminal portions extending through the end cap for connection to an external supply. Commutator contact portions 26 are formed near the distal ends of the fingers 23 and the area between the holders may be left blank or arranged to receive electrical components such as resistors, varistors and capacitors. Two chip capacitors 43 are shown for illustrative purposes surface mounted on the flexiboard 22 across small extensions of the conductive layers. The phantom lines show the location of the holders/terminals.

Figure 10:
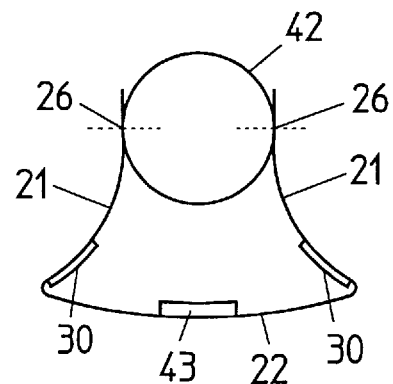

The brush gear 20 of FIG. 9 may be arranged in the end cap as shown in FIG. 10. The two holders 30 have integral terminal portions 19 simplifying the fitting, securing and connecting procedure. The arrangement is similar to the arrangement of FIG. 8. The fingers of the two brushes contact the commutator 42 at diametrically opposite locations and extend in a cantilevered fashion from respective holders 30. The spread of the flexiboard between the holders is thus available for mounting noise suppression components or other electronic components as may be desired.

Figure 11:
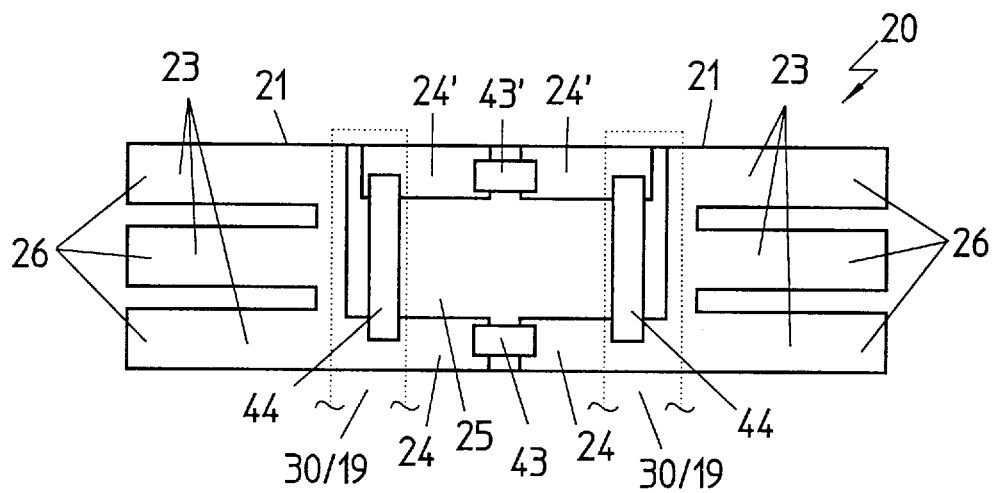
Figure 12:
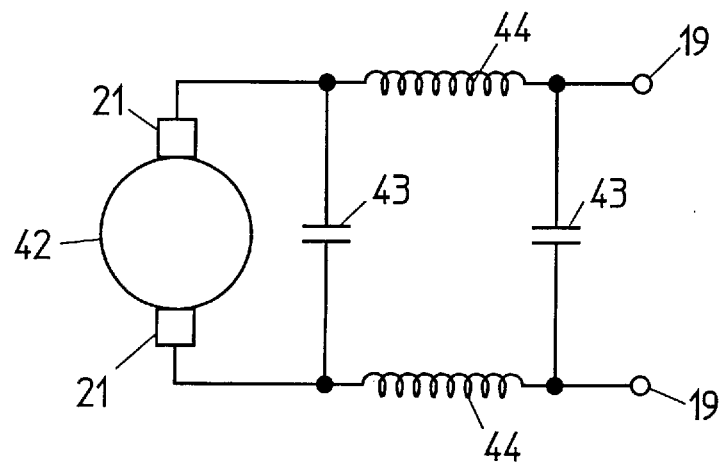
FIG. 12 is a schematic circuit diagram of the embodiment of FIG. 11.

FIG. 11 illustrates a modification of the brush gear 20 of FIG. 9 in which chokes or inductors 44 are connected in series between the contact portions 26 and respective holders/terminals 30/19. The flexiboard 22 again forms two separate brushes 21, each having three fingers 23 extending from the holders 30 and having separate contact portions 26 formed at the distal ends for contacting a commutator. The conductive layers 24 connect the contact portions to the chokes 44 and a capacitor 43 is connected between the two conductive layers 24. The chokes connect the conductive layers 24 to secondary conductive layers 24'. A second capacitor 43' is connected between the two secondary conductive layers 24'. The holders/terminals 30/19 are electrically connected to the secondary layers 24' by through plating or other techniques commonly used and insulated from the conductive layer 24 to form the electric circuit shown in FIG. 12 where the terminals are connected to respective chokes in series with the brushes and two capacitors are connected across the chokes, one at either end to suppress electrical noise generated by the motor before it reaches the terminals.

Various modifications to the described embodiments will be apparent to those skilled in the art and it is desired to include all such modifications as fall within the scope of the invention as described herein.

I claim:

1. A brush for a miniature electric motor, comprising:

an elongate flexible substrate;

a flexible conductive layer formed on the substrate and having a contact portion for making sliding contact with a commutator; and holder means for supporting the substrate in position to allow the contact portion to make contact with the commutator, the holder means including two mounting plates fixed to longitudinal ends of the substrate and arranged to be rigidly mounted to a brush gear support plate.

2. A brush as defined in claim 1 wherein the brush gear support plate is an end cap of the motor.

3. A brush as defined in claim 1 wherein the mounting plates have at least one tongue adapted to locate in mounting holes in the support plate and the tongues have barbs for biting into sides of the mounting holes to secure the plates.

4. A brush as defined in claim 3 wherein the tongue of one of the mounting plates is arranged to extend through the support plate and forms a motor terminal, the mounting plate being electrically conductive and connected to the contact portion.

5. A brush as defined in claim 3 wherein the tongues of both plates extend through the support plate and form motor terminals and the conductive layer forms two separate electrical circuits connected to respective motor terminals.

6. A brush as defined in claim 5 wherein the substrate is cut to form fingers supporting respective contact portions and shaped by the orientation of the holder means when mounted to the support plate to cause the contact portions to contact the commutator at diametrically opposite positions.

7. A brush as defined in claim 1 wherein the contact portion includes a layer of material selected from the group consisting of silver, palladium silver, gold, platinum, rhodium, graphite, hard copper and alloys thereof.

8. A brush as defined in claim 1 wherein the flexible substrate is a polyimide material.

9. A brush as defined in claim 1 where in the flexible conductive layer is a predominantly copper material film.

10. A miniature electric motor comprising:

a stator;

a wound rotor including a commutator;

motor terminals for connecting the motor to a source of electrical power;

a brush gear for electrically connecting the motor terminals to the commutator; and a brush support plate for supporting the brush gear, the brush gear including two elongate flexible substrates, each having a flexible conductive layer which includes a contact portion intermediate its ends for making sliding contact with the commutator, each substrate being secured to the brush support plate at its ends by holders and held in a curve to resiliently urge the respective contact portions into sliding contact with the commutator at diametrically opposite locations.

11. A motor as defined in claim 10 wherein the holder means comprises mounting plates having tongues which locate in holes formed in the support plate, with barbs formed on an edge of the tongues which interfere with the sides of the holes to secure the mounting plates to the support plates.

12. A motor as defined in claim 10 wherein the support plate is an end cap of the motor and the holder means comprises at least one holder which is conductive, connected to the conductive layer, integral with one of the motor terminals and extends through the end cap, thereby connecting the motor terminal to the commutator.

13. A motor as defined in claim 10 wherein the flexible substrate is formed with two sets of elongate fingers, each set comprising the same number of fingers being at least one, each finger having a contact portion adjacent its free end and each set of fingers being associated with a respective electrical circuit formed by the conductive layer.

14. A motor as defined in claim 13 wherein the substrate supports electrical components for noise suppression connected to the electrical circuits.

15. A motor as defined in claim 13 wherein the sets of fingers extend from opposite ends of the substrate and are fixed to the brush support plate by two conductive holders with integral motor terminals and arranged to resiliently urge the contact portions of respective sets of fingers to bear on diametrically opposite sides of the commutator.

16. A motor as defined in claim 10 wherein the contact portion comprises a layer of material selected from the group consisting of silver, palladium silver, gold, platinum, rhodium, graphite, hard copper and alloys thereof, forming a part of the conductive layer.

17. A motor as defined in claim 10 wherein the substrate is a polyimide material and the conductive layer is predominantly a copper based conductive film.

* * * * *